United States Patent Office

3,692,733
Patented Sept. 19, 1972

3,692,733
RESIN COATED SAND
Calvin Keith Johnson, Palos Heights, Ill., assignor to
CPC International Inc.
No Drawing. Filed Mar. 8, 1971, Ser. No. 122,125
Int. Cl. C08g 51/04
U.S. Cl. 260—38                                  6 Claims

ABSTRACT OF THE DISCLOSURE

A resin coated sand exhibiting low dust levels consisting essentially of about 1,000 parts of resin coated sand, and from about 0.01 to about 1.0 parts of silicone fluid.

BACKGROUND OF THE INVENTION

The shell molding process for the production of sand mold sections for the casting of metals is well known in the prior art. While there are many variations of this process, a preferred process comprises depositing a combination of sand and resin against a heated pattern such that the resin melts and cures to form a rigid shell mold section for use in the casting of metals. For sometime the combination of resin and sand used in the process was essentially a dry mixture of sand and powdered resin. Examples of such mixtures are disclosed in U.S. Pats. Nos. 2,692,246 and 2,912,406.

A notable advance in the art of shell molding was the introduction of storage-stable, free-flowing sand grains, each provided with a solid, nontacky coating of potentially thermosetting phenolic resin. Phenolic resin coated sands eliminated the dust and explosion hazards associated with mixtures of powdered resin and sand. In addition, phenolic resin coated sands avoided the problems of separation and stratification of the sand and resin components, thereby, permitting the production of shell molds of more uniform character and of improved physical properties. (Useful examples of potentially thermosetting phenolic resin coated sands are disclosed in U.S. Pats. Nos. 2,706,163; 2,888,418 and 2,914,823.)

Since phenolic resin coated sands exhibited a marked improvement in dust levels as compared with the powdered phenolic resin and sand mixtures of the prior art, they were often characterized as "dustless." (See for example U.S. Pat. No. 2,706,613.) Resin coated sands, however, are not truly dustless. In fact, such sands generally have dust levels such that the dust is a significant problem. This dust is generally comprised of particles of resin, sand and adjuvants which are significantly smaller than the resin coated sand.

The dust level of resin coated sand tends to increase as the coated sand is handled and transported. Dusty sand, therefore, is especially a problem for commercial coaters who must transport the coated sand to and from storage bins to trucks, or railway cars, and ship the resin coated sand long distances. In addition, a coated sand with significant dust levels will generally result if during the process of preparing the coated sand, the sand is mulled for too long a period of time.

Resin coated sands with high dust levels are a significant problem in processes wherein a shell mold or core is formed by blowing the resin coated sand into patterns or core boxes. When dust is present in the coated sand used in the blowing process, it collects in core box vents and plugs them. If the core box vents are plugged, it is generally impossible to blow dense uniform cores. In addition, the dust tends to collect in certain areas of the core box, i.e., stratification occurs, and often causes sticking and/or produces a poor quality surface on the core. This is undesirable since cores with poor surfaces produce metal castings which exhibit a poor surface finish.

SUMMARY OF THE INVENTION

It has been surprisingly found that novel resin coated sands consisting essentially of an intimate mixture of from about 0.01 to about 1.0 part silicone fluid and about 1,000 parts resin coated sand exhibit unexpectedly low dust levels. In addition, it has been found that dust can be substantially reduced in resin coated sands in a novel process comprising the steps of (1) introducing from about 0.01 to about 1.0 part of silicon fluid to about 1,000 parts of resin coated sand, and (2) intimately mixing the silicone fluid and resin coated sand.

DISCUSSION OF THE INVENTION AND ITS PREFERRED EMBODIMENTS

This invention presents novel resin coated sands particularly suited for forming shell molds for foundry use which exhibit unexpectedly low dust levels and a novel process for obtaining these sands.

The resin coated sands of this invention consist essentially of an intimate mixture of from about 0.01 to about 1.0 part by weight, of silicone fluid and 1,000 parts, by weight of free-flowing particles of sand individually coated with from about 1% to about 6%, by weight of sand, of a solid, nontacky layer of potentially thermosetting resin.

Resin coated sands especially useful in this invention are particles of sand, separate from adjacent particles, coated with from about 1% to about 6% by weight of a solid thermoplastic and potentially thermosetting resin comprising an acid catalyzed thermoplastic phenol-formaldehyde resin and curing agent.

Methods for forming free-flowing resin coated sands coated with a solid layer of thermoplastic and potentially thermosetting resin are well known in the art. Generally these methods utilize a thermoplastic phenolic resin composition comprising an acid catalyzed phenol-formaldehyde resin formed by reacting phenol and formaldehyde in a molar ratio of from about 0.5 to about 0.85 mole of formaldehyde to mole of phenol in the presence of an acid catalyst, such as for example from about 0.4% to 0.8% of hydrochloric acid by weight of the phenol, or more when employing acids such as sulfuric or oxalic acids. The phenolic resin polymer formed in the process is conveniently brought to the desired stage of polymerization by heating the reactants, preferably at a temperature from about 35° C. to about 100° C., after which the acid catalyst is neutralized. Water in the resulting reaction mixture can be removed by evaporation under reduced pressure. A portion of the water can be removed to form a concentrated liquid resin product suitable for use in forming resin coated sand, or sufficient water can be removed such that the resin is a solid at room temperature (25° C.). The solid resin can be ground to a powder or flaked and the resulting resin solids can be used to form a resin coated sand.

Generally, the process of coating sand with resin involves placing the sand in any one of several types of mixers commonly used in foundry work. Examples of these are: the Beardsley-Piper Speed muller and the Simpson muller. To this sand is added from about 1% to about 6% by weight of resin and a suitable amount of curing agent to render the resin thermosetting. Examples of useful curing agents are hexamethylenetetramine and formaldehyde. The preferred curing agent is hexamethylenetetramine. An amount of this curing agent suitable for rendering the resin thermosetting is from about 8% to about 20% by weight of resin. The components are heated and mixed to coat each of the sand grains with a layer of resin and curing agent. After the sand is coated with resin, the coated sand is cooled to room temperature, as for example by quenching with water. The mixing is continued for a sufficient time to obtain a free flowing product.

According to the process of this invention, novel resin coated sands are obtained by a process comprising the steps of (1) introducing from about 0.01 to about 1.0 part of silicone fluid to about 1,000 parts by weight of sand coated with from about 1% to about 6%, by weight of sand, of a solid, nontacky layer of potentially thermosetting resin; and (2) intimately mixing the silicone fluid and resin coated sand. Mixing of the silicone fluid and resin coated sand is preferably conducted in the mixer used to coat the sand. In a preferred aspect of this invention the silicone fluid is introduced in the coating process at the point when the sand grains are substantially coated with resin but just prior to break-up into individual particles and the mixing is continued to obtain a free flowing intimate mixture of silicone fluid and resin coated sand. The resin coated sands of this invention are dry, nontacky, free flowing and exhibit substantially lower dust levels than conventional resin coated sands.

The silicone fluids useful in this invention are liquid at 25° C. and have a boiling point of above about 200° C. Among the suitable silicone fluids having a boiling point above about 200° C. are linear polydimethylsiloxanes having the formula

$(CH_3)_3SiO[Si(CH_3)_2O]_nSi(CH_3)_3$ wherein $n$ is an integer above about 3, as for example from about 3 to about 30, preferably about 3 to about 15. Examples of useful silicone fluids are dodecamethylpentasiloxane, tetradecamethylhexasiloxane, hexadecamethylheptasiloxane, and eicosamethylnonasiloxane. Other silicone fluids which are liquid at 25° C. and have a boiling point above 200° C., preferably above about 300° C., are useful herein.

The silicone fluid can be in the form of an emulsion. An especially preferred silicone emulsion useful in the process of this invention is Dow Corning #8 Silicone Emulsion marketed by Dow-Corning Chemical Company, an aqueous emulsion based on a medium low viscosity polydimethylsiloxane fluid having a viscosity of 1000 centistokes.

It is often the practice in the foundry art to include a variety of adjuvants in resin coated sands, as for example, waxy compounds such as calcium stearate and bis-stearoxylamide of ethylene-diamine. Resin coated sands with adjuvants are useful in this invention. For example, U.S. Pats. 2,706,163; 2,888,418; 2,912,406 and 3,020,254, incorporated herein by reference, disclose a variety of resin coated sands useful in this invention.

The following examples particularly illustrate several preferred embodiments of the invention and the improvements resulting therefrom.

EXAMPLE I

Part A

A phenolic resin was formed in the following manner. A charge of 1,000 grams phenol and 10 grams sulfuric acid was placed in a reaction flask. The temperature of the resulting mixture was raised to 100° C. and 650 grams of aqueous 37% by weight formaldehyde were slowly added to the mixture. After the formaldehyde had been completely added, the mixture was refluxed for 45 minutes to form a phenolic resin. A lime slurry comprising 8.7 grams lime and 20 grams water was then added to the mixture to neutralize the sulfuric acid. The resin was then dehydrated and cooled to form a solid brittle resin product. The brittle resin formed was ground, mixed with 15% by weight of hexamethylenetetramine and the resulting mixture was pulverized to a powder.

Two and one half pounds of this pulverized resin and 100 pounds of Wedron #60 foundry sand were placed in a muller and mixed together for several minutes. While mixing continued a solution containing 300 g. of ethyl alcohol and 100 g. water were added in a stream. The mixing was continued for about 20 minutes. The resulting material was comprised of free flowing particles of sand individually coated with about 2.5% by weight of a solid nontacky layer of resin.

An operator skilled in the foundry sand art visually rated the sand for dustiness by pouring the coated sand from one container into another. The sand was observed to exhibit a high level of dust.

This process and the resulting product is not an example of the invention herein, but is provided to comparatively illustrate the advantages of the invention.

Part B

A resin coated sand is prepared as in Part A, except that during the last 20 minutes of mixing 1 oz., of a silicone fluid, hexadecamethylheptasiloxane, is added. This silicone fluid has a boiling point above 200° C. This mixing operation intimately mixed the silicone fluid and the resin coated sand. The resulting product was a resin coated sand such as obtained in Part A intimately admixed with the silicone fluid, such that each 1000 parts of the resin coated sand contained 0.6 part of the silicone fluid. This process and the resulting resin product is illustrative of the invention.

An operator skilled in the foundry sand art examined the sand for dustiness by pouring the sand from one container into another. This resin coated sand exhibited a dust level which was substantially below that exhibited by the resin coated sand of Part A.

EXAMPLE II

When in Example I, 1 oz. of eicosamethylnonasiloxane is used in place of hexadecamethylheptasiloxane, substantially the same results were obtained in that a resin coated sand was obtained which exhibits a low dust level.

EXAMPLE III

When in Example I, 2 oz. of a silicone fluid emulsion known as Dow Corning #8 Emulsion, an aqueous emulsion containing 35% of a linear polydimethyl siloxane fluid (1000 cs.), a silicone fluid having a boiling point greater than 200° C., is used in the place of hexadecamethylheptasiloxane, substantially same results were obtained in that a resin coated sand is obtained which exhibits a low dust level.

EXAMPLE IV

In this example, a "Dust Index Apparatus" is employed to provide numerical data representing the dust level of resin coated sands. This apparatus comprises a cylinder rotatable about its axis at a constant speed, the body of the cylinder having a charging port, a vent at one end of the cylinder, a conduit at the other end of the cylinder, the conduit being fitted with a fritted glass filter and vacuum means for drawing air through the cylinder and filter. The apparatus used in this example employed a cylinder having a diameter of 4" and a length of 6".

Part A

A phenolic resin was formed in the following manner. A charge of 1,000 parts of phenol and 7 parts of 50% sulfuric acid was placed in a reactor. The temperature of the mixture is raised to 100° C. and 650 parts of aqueous 37% by weight formaldehyde were slowly added. After the formaldehyde was completely added, the mixture is refluxed for 45 minutes to form a phenolic resin. A lime slurry comprising 3 parts lime and 7 parts water was then added to the mixture to neutralize the sulfuric acid. Fifty parts of bis-stearoylamide of ethylenediamine, a waxy adjuvant, was added to the mixture, and the mixture was dehydrated. The resulting resin product was cooled and converted to a flake by passing it through a roll mill equipped with cooled stainless steel rollers.

A resin coated sand was prepared in the following manner. One thousand pounds of Wedron 5025 foundry sand was heated to 130° C. and added to a 1000 pound capacity Beardsley-Piper Speed muller. 35 pounds of the above flake resin product was added to the muller and the mixture of resin and sand mulled for 90 seconds to melt the flake and coat it onto the sand. Then a solution of 5.25 pounds of hexamethylenetetramine in 20 pounds of water was added to the muller. Mulling was continued until the mixture broke up into free flowing grains of coated sand. The coated sand was then discharged from the muller. This sand is designated as "Sand A."

Part B

A resin coated sand of this invention was prepared according to the procedure of Part A above except that when the sand was substantially coated with resin about 3 oz. of silicone fluid, Dow Corning #8 Emulsion was added with the hexamethylenetetramine solution and the mixing was continued until a free flowing nontacky resin coated sand intimately mixed with the silicone fluid was obtained. This resin coated sand is designated as "Sand B."

The dust levels of the resin coated sands obtained in Parts A and B were evaluated using the Dust Index Apparatus. The dust level was evaluated in the following manner. Fifty grams of resin coated sand obtained in Part A above was charged to the cylinder of the dust index apparatus. The cylinder was rotated at a constant speed of 15 r.p.m., and air was drawn through the rotating system by vacuum at 0.8 cubic feet/minute for 10 minutes. At this point the pre-weighed fritted glass filter was removed and weighed. The increase in weight indicated the amount of dust collected during the 10 minute period. The test was continued in this manner for a period of 30 minutes with readings being made at 10 minute intervals.

In the same manner the dust level of the resin coated sand obtained in Part B is determined.

The results of these tests are outlined in Table I below. A comparison of the results indicates that the novel resin coated sand of this invention exhibits substantially lower dust levels than ordinary resin coated sands.

| TABLE I (Sand A) | | | TABLE II (Sand B) | | |
|---|---|---|---|---|---|
| Time, min. | Weight of dust collected, g. | Percent dust | Time, min | Weight of dust collected, g. | Percent dust |
| 10 | 0.0115 | .023 | 10 | 0.002 | .004 |
| 20 | 0.0145 | .029 | 20 | 0.0025 | .005 |
| 30 | 0.0164 | .033 | 30 | 0.003 | .006 |

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

All percentages and parts herein are on a weight basis unless otherwise specified.

I claim:

1. Resin coated sand exhibiting low dust levels consisting essentially of an intimate mixture of
    (a) about 1000 parts, by weight, of free flowing particles of sand individually coated with from about 1 to 6% by weight of solid, nontacky layer of potentially thermosetting resin, and
    (b) from about 0.01 to about 1.0 part, by weight, of silicone fluid, said silicone fluid being a liquid at 25° C. and having a boiling point above about 200° C.

2. The resin coated sand of claim 1 wherein the potentially thermosetting resin is a phenol-formaldehyde resin.

3. The resin coated sand of claim 2 wherein the silicone fluid is a silicone fluid having a boiling point above about 300° C.

4. The resin coated sand of claim 1 wherein the silicone fluid is a polydimethylsiloxane having the formula $$(CH_3)_3SiO[Si(CH_3)_2O]_nSi(CH_3)_3$$

wherein $n$ is a integer above about 3.

5. The resin coated sand of claim 4 wherein $n$ is from about 3 to about 30.

6. The resin coated sand of claim 5 wherein $n$ is from about 3 to about 15.

References Cited

UNITED STATES PATENTS

| | | | |
|---|---|---|---|
| 2,841,845 | 7/1958 | Bleuenstein | 260—Dig. 40 |
| 2,878,539 | 2/1959 | Halpern et al. | 164—21 |

FOREIGN PATENTS

| | | | |
|---|---|---|---|
| 1,106,090 | 3/1968 | Great Britain | 260—Dig. 40 |

OTHER REFERENCES

Freeman: Silicones; Iliffe Books Ltd.; 1962; p. 28.

LEWIS T. JACOBS, Primary Examiner

U.S. Cl. X.R.

260—Dig. 40